United States Patent [19]

McVicker

[11] Patent Number: 4,829,885
[45] Date of Patent: May 16, 1989

[54] VENTILATION SYSTEM FOR ANIMAL ENCLOSURES

[75] Inventor: Robert J. McVicker, Niles, Mich.

[73] Assignee: AAA Associates, Inc., Niles, Mich.

[21] Appl. No.: 229,260

[22] Filed: Aug. 8, 1988

[51] Int. Cl.[4] ............................................. F24F 7/06
[52] U.S. Cl. ........................................ 98/39.1; 98/119
[58] Field of Search ................. 98/33.1, 39.1, 40.17, 98/40.19, 119

[56] References Cited

U.S. PATENT DOCUMENTS

| | | | |
|---|---|---|---|
| 181,272 | 8/1876 | Lane | 98/119 |
| 1,975,316 | 10/1934 | Ferris | 98/119 X |
| 3,138,086 | 6/1964 | Rigterink et al. | 98/119 X |
| 3,299,798 | 1/1967 | Habben | 98/119 |
| 4,022,117 | 5/1977 | Mallian | 98/119 X |
| 4,334,577 | 6/1982 | George | 98/119 X |

*Primary Examiner*—Harold Joyce
*Attorney, Agent, or Firm*—James D. Hall

[57] ABSTRACT

A ventilation system for use in animal confinement enclosures. A duct extends the length of the enclosure and includes a back pressure plate having a plurality of holes. A flexible baffle is positioned adjacent the back pressure plate exterior of the duct. The baffle flexes away from the plate under force of air being introduced through the duct holes and serves to spread air evenly the length of the duct and reduce the exiting force. An exhaust fan is also included to draw air out of the enclosure.

4 Claims, 1 Drawing Sheet

VENTILATION SYSTEM FOR ANIMAL ENCLOSURES

BACKGROUND OF THE INVENTION

This invention relates to ventilation systems and will have specific reference to a system for uniformly ventilating an animal enclosure or building.

Heretofore, ventilation systems for animal enclosures, such as hog confinement bars, typically include a series of blowers or fans positioned so as to draw the air out of the enclosure. Such ventilation systems further include a series of vents for allowing a controlled amount of air into the building. Such systems are commonly referred to as negative pressure ventilation since the volume of incoming air is less than that being drawn out. Negative pressure systems rely in great part on the quantity of air being moved through the building to provide the adequate heating or cooling of the animals contained therein. Another method of ventilating animal enclosures includes the placement of several fans around the inside of the building to blow preheated or precooled air throughout the building. This is a positive pressure system. Lastly, there is a combination system using both fans that draw air from and fans that blow air into buildings. In this combination system air is blown by a fan into an elongated duct where it passes laterally into the room to be drawn by another fan from the room. One problem associated with the prior ventilation systems is the lack of uniform air distribution along the building which causes stratification by temperature of the air within the building, reducing temperature consistency of air around the animals. The stratification is particularly dangerous to swine during the summer months which, since they do not sweat, must have cool air circulated around them to prevent them from overheating and becoming ill.

SUMMARY OF THE INVENTION

The ventilation system of this invention eliminates the problems experienced with the prior ventilation methods by providing the air duct which extends the length of the building with a flexible baffle which overlies the series of outlet ports along the side of the duct. The duct side with its outlet ports forms a back pressure plate to provide even air flow the length of the duct. The baffle which overlies the duct outlet ports serves to distribute the air exiting the plate holes more along the vent. The ventilation system of this invention substantially eliminates stratification and improves air temperature consistency by controlling the direction and amount of air flow.

Accordingly, it is an object of this invention to provide an animal ventilation system for distribution of preconditioned air.

Another object of this invention is to provide a ventilation system which distributes preconditioned air evenly along the length of a discharge vent.

Other objects of this invention will become apparent upon a reading of the following description.

DESCRIPTION OF THE PREFERRED EMBODIMENT

The preferred embodiment herein described is not intended to be exhaustive or to limit the invention to the precise form disclosed. It is chosen and described in order to explain the principles of the invention and its application and practical use to enable others skilled in the art to utilize the invention.

Figure 1:
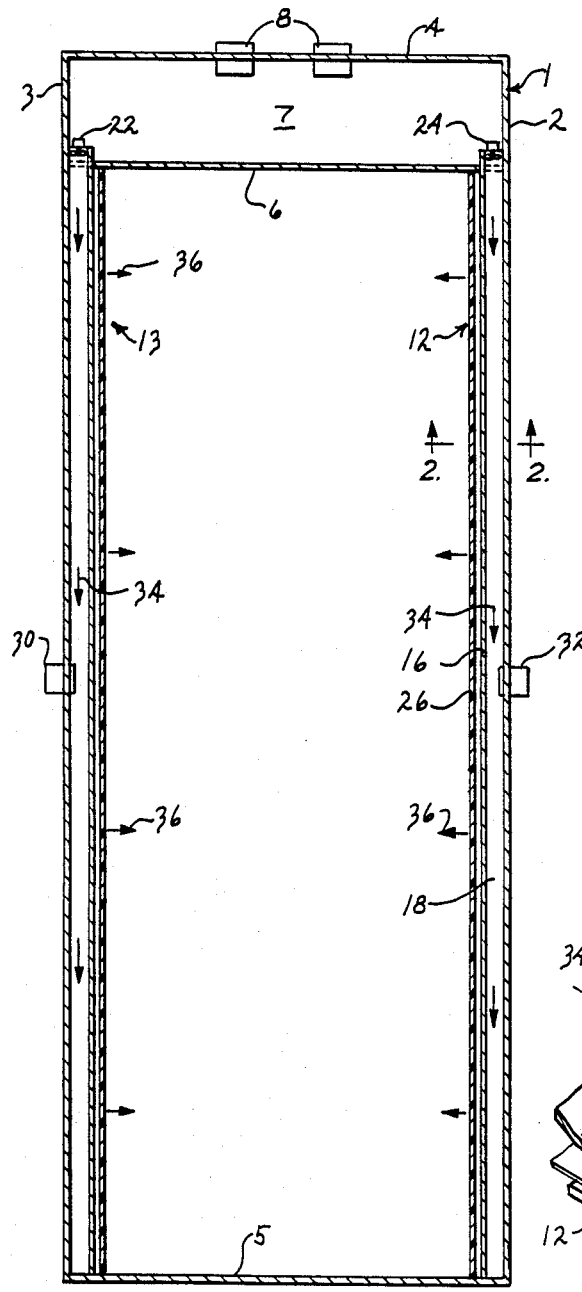
FIG. 1 is an overhead sectional view of a typical animal enclosure with the ventilation system of this invention installed.

Referring now to FIG. 1, a typical animal enclosure or building 1 is illustrated having side walls 2, 3 and end walls 4, 5. An interior wall 6 extends between side walls 2, 3 and upwardly to ceiling 11 to separate building 1 into an air preconditioning chamber 7 and an animal confinement area 9. Combination heaters/air conditions 8 are placed in end wall 4 to warm the air contained within chamber 7 during cold weather and cool the air during warm weather. Building 1 further includes a series of rafters 10 which span walls 2, 3 to support a roof structure (not shown). A ceiling 11 is fastened to rafters 10 by conventional fasteners (not shown).

Figure 2:
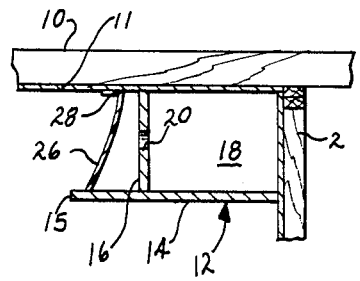
FIG. 2 is a fragmentary sectional view taken along line 2—2 of FIG. 1.
Figure 3:
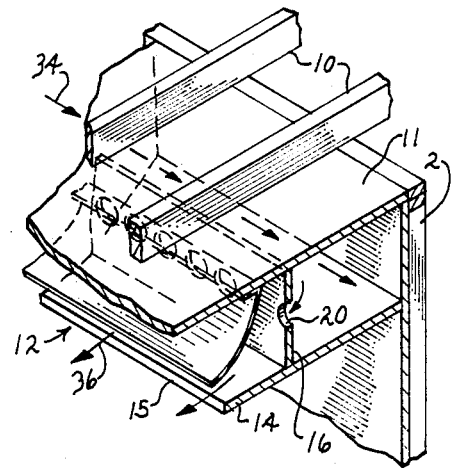
FIG. 3 is a fragmentary perspective view of the ventilation duct.

The ventilation system of this invention includes air ducts 12, 13 which extend longitudinally of building 1 between walls 5 and 6 along side walls 2, 3 from chamber 7. Air ducts 12, 13 are identical in construction, and therefore only duct 12 will be described. Air duct 12 as illustrated in FIGS. 2 and 3 includes a bottom wall 14 which extends from side wall 2 substantially parallel to ceiling 11. A back pressure plate or inner side wall 16 is connected between ceiling 11 and duct bottom wall 14, inwardly spaced from outer edge 15 of the bottom wall. Together, ceiling 11, side wall 2, bottom wall 14 and back pressure plate 16 form an elongated air passage 18 which extends into and is in communication with chamber 7. Pressure plate 16 includes a series of spaced, longitudinally extending holes 20 to allow the forced air within air passage 18 to exit into animal confinement area 9. Holes 20 preferably extend the entire length of duct 12. A flexible baffle 26 is connected by a flexible hinge part 28 to ceiling 11 adjacent and just in front of pressure plate 20. Baffle 26 preferably extends the length of air duct 12 and contacts bottom wall 14.

To transfer preconditioned air from chamber 7 through air ducts 12, 14 and into confinement area 9, fans 22, 24 are positioned within the ends of the ducts in chamber 7. To remove air contained within enclosure confinement area 9, fans 30, 32 are positioned in walls 2, 3, below air ducts 12, 14. Fans 30, 32 are located so as to draw air from within area 9.

With fans 22, 24 switched off, baffle 26 covers pressure plate 20 as illustrated in FIG. 2. When fans 22, 24 are switched on either by a manual or thermostatic switch (not shown), air flow is established in the direction of arrows 34 through the air passages 18. Air is blown out of each air passage 18 through holes 20 towards baffle 26 as illustrated by arrows 36. Such air pushing against baffle 26 causes it to flex away from plate 16 and duct bottom wall 14 to allow the lateral distribution of air flow into confinement area 9. Baffle 26 serves to spread the existing air along the duct and provide generally even air flow into confinement area 9 along the entire length of the duct. The air flow enters confinement area 9 as illustrated by arrows 36 at substantially a ninety degree angle to the air ducts 12, 13 thus providing adequate ventilation and air mixing to all areas of confinement area 9. To further aid the mixing of air within confinement area 9, fans 30, 32 are turned on to draw air from the chamber and exhaust it to the outside. It is preferable if fans 22, 24, 30, 32 are all used simultaneously.

It should be understood that although the two ducts are illustrated, a central duct having a pressure plate and baffle on each side could be used. It should be further understood that the invention is not to be limited to the details above described but may be modified within the scope of the appended claims.

I claim:

1. A ventilation system for circulating air through animal enclosures, said ventilation system including a duct in air flow communication between an animal confinement area and an air flow source, said duct having an interior side wall extending within said confinement area, said duct side wall having reduced opening means extending along the duct, baffle means suspended for pivotal movement above and over said opening means, said baffle means spanning said duct opening means and being pivotal into an open position when contacted by forced air emerging from said opening means, blower means connected to said air duct for introducing air into the duct and forcing air through said opening means, said baffle means for distributing said forced air along the duct into said animal confinement area.

2. The ventilation system of claim 1 wherein said duct includes a bottom wall extending outwardly from said interior side wall toward said confinement area, said baffle means including a lower edge and being pivotal into a closed position having said lower edge adjacent said bottom wall when said blower means is deactivated.

3. The ventilation system of claim 2 said air duct includes a top wall adjacent the ceiling of said animal confinement area and an outer side wall adjacent the side wall of said animal confinement area.

4. The ventilation system of claim 2 wherein said opening means constitutes a plurality of openings spaced apart longitudinally along said duct.

* * * * *